(12) United States Patent
Oikawa

(10) Patent No.: US 11,590,582 B2
(45) Date of Patent: Feb. 28, 2023

(54) CUTTING INSERT AND ROTARY CUTTING TOOL

(71) Applicant: TUNGALOY CORPORATION, Fukushima (JP)

(72) Inventor: Yuki Oikawa, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 0 days.

(21) Appl. No.: 17/368,258

(22) Filed: Jul. 6, 2021

(65) Prior Publication Data

US 2022/0048115 A1 Feb. 17, 2022

(30) Foreign Application Priority Data

Aug. 11, 2020 (JP) .............................. JP2020-135784

(51) Int. Cl.
*B23B 27/16* (2006.01)
*B23C 5/20* (2006.01)
*B23C 5/02* (2006.01)

(52) U.S. Cl.
CPC .......... *B23B 27/1611* (2013.01); *B23C 5/202* (2013.01); *B23C 5/02* (2013.01)

(58) Field of Classification Search
CPC .......... B23B 27/1611; B23C 2200/284; B23C 2200/283; B23C 2200/12; B23C 2200/125; B23C 2200/123; B23C 2200/121; B23C 5/06; B23C 5/202
See application file for complete search history.

(56) References Cited

U.S. PATENT DOCUMENTS

| | | | | |
|---|---|---|---|---|
| 6,543,970 | B1 * | 4/2003 | Qvarth | B23C 5/202 407/115 |
| 8,708,616 | B2 * | 4/2014 | Smilovici | B23C 5/202 407/42 |
| 8,998,542 | B2 * | 4/2015 | Ishi | B23C 5/202 407/42 |
| 9,050,667 | B2 * | 6/2015 | Park | B23C 5/22 |
| 9,278,396 | B2 * | 3/2016 | Diepold | B23C 5/202 |
| 9,511,427 | B2 * | 12/2016 | Horiike | B23C 5/202 |
| 9,533,356 | B2 * | 1/2017 | Koga | B23B 27/18 |
| 10,131,002 | B2 * | 11/2018 | Matsumura | B23C 5/20 |
| 2012/0070240 | A1 * | 3/2012 | Ishi | B23C 5/202 407/42 |
| 2012/0301235 | A1 * | 11/2012 | Yoshioka | B23C 5/2213 407/115 |

(Continued)

FOREIGN PATENT DOCUMENTS

WO 2016047795 A1 3/2016
WO 2016080486 A1 5/2016

*Primary Examiner* — Nicole N Ramos
(74) *Attorney, Agent, or Firm* — Studebaker & Brackett PC

(57) ABSTRACT

Provided is a cutting insert that can suppress damage of a corner cutting edge. The cutting insert has an approximately polygonal shape, and is constituted of a main cutting edge and a corner cutting edge connected to the main cutting edge. The cutting insert includes: a first side face portion that is connected to the main cutting edge, has a negative clearance angle, and is formed such that height thereof increases gradually in a direction of approaching the corner cutting edge; and a second side face portion that is connected to the corner cutting edge, has a negative clearance angle, and has height that is greater than the first side face portion.

6 Claims, 6 Drawing Sheets

(56) References Cited

U.S. PATENT DOCUMENTS

| | | |
|---|---|---|
| 2013/0294850 A1 | 11/2013 | Park |
| 2014/0010605 A1 | 1/2014 | Smilovici et al. |
| 2014/0377020 A1* | 12/2014 | Kurokawa ............... B23C 5/20 407/51 |
| 2017/0225243 A1* | 8/2017 | Matsumura ............. B23C 5/202 |
| 2017/0291231 A1 | 10/2017 | Mao |
| 2019/0321898 A1 | 10/2019 | Eriksson et al. |

* cited by examiner

CUTTING INSERT AND ROTARY CUTTING TOOL

BACKGROUND

Field

The present invention relates to a cutting insert and a rotary cutting tool.

Description of Related Art

Conventionally, cutting inserts for rotary cutting tools are known. In recent years, in order to improve processing efficiency, demand for a rotary cutting tool that can perform high feed processing is increasing.

However, in the case of high feed processing, the processing cutting load on the cutting edge increases, and damage such as a broken edge more easily occur to the cutting edge.

WO 2016/080486 discloses a cutting insert constituted of a first corner side face portion and a second corner side face portion to suppress damage and enhance strength of the cutting edge. As FIG. 6 in WO 2016/080486 indicates, the first corner side face portion has an obtuse angle with respect to the reference plane, and the second corner side face portion has an acute angle with respect to the reference plane. According to this cutting insert, the corner side face portion capacity can be increased, which makes it possible to improve the strength of the cutting edge.

WO 2016/047795 discloses a cutting insert in which a second surface is formed on a side face correspondingly to a first lower cutting edge, and a third surface is formed correspondingly to a first upper cutting edge, in order to enhance the strength of the first lower cutting edge and the first upper cutting edge to which a large load is applied. The second surface is formed inclined so as to be at a more distance from the center axis gradually in the direction from the lower face to the upper face, and the third surface is formed inclined so as to at a more distance from the center axis gradually in the direction from the upper face to the lower face, hence the strength of the first lower cutting edge and the first upper cutting edge can be enhanced.

SUMMARY

However, in the cutting insert disclosed in these patent publications, it is difficult to sufficiently suppress the damage of the corner cutting edge. In the case of the cutting insert according to WO 2016/080486, the height of the first corner side face portion becomes highest at the side face portion corresponding to the main cutting edge, and the height of the first corner side face portion decreases gradually in the direction of approaching the corner cutting edge, hence the damage of the corner cutting edge cannot be sufficiently suppressed.

WO 2016/047795, on the other hand, does not disclose a means of suppressing the damage of the corner cutting edge.

With the foregoing in view, it is an object of the present invention to provide a cutting insert and a rotary cutting tool that can suppress damage of the corner cutting edge.

The present disclosure provides a cutting insert having an approximately polygonal shape and constituted of a main cutting edge and a corner cutting edge connected to the main cutting edge, the cutting insert including: a first side face portion that is connected to the main cutting edge, has a negative clearance angle, and is formed such that height thereof increases gradually in a direction of approaching the corner cutting edge; and a second side face portion that is connected to the corner cutting edge, has a negative clearance angle, and has height that is greater than a maximum value of the height of the first side face portion.

The cutting insert may include a first end face in which a through hole is formed.

The cutting insert may further include, a first cutting edge that includes the main cutting edge and the corner cutting edge, a second cutting edge and a third cutting edge which are formed to be rotationally symmetric respectively with the first cutting edge, with respect to a center axis of the through hole as a reference.

The first end face may be formed to be an approximately hexagonal shape and include: a first corner in which the corner cutting edge is provided; two corners which are formed to be rotationally symmetric with the first corner by 120 degrees respectively, with respect to the center axis of the through hole as a reference; a second corner which adjoins the first corner, has a larger vertical angle than the first corner, and includes the main cutting edge which is provided between the first corner and the second corner; and two corners which are formed to be rotationally symmetric with the second corner by 120 degrees respectively, with respect to the center axis of the through hole as a reference.

The first cutting edge may further include an end cutting edge that is connected to the main cutting edge and is formed in the second corner.

Further, the cutting insert may include a side face that is connected to the first end face, and includes: the first side face portion; the second side face portion; and a third side face portion that is connected to the first side face portion and the second side face portion, and is parallel with the center axis of the through hole.

Further, a boss surface may be formed on the first end face, and in a side view viewed in a direction perpendicular to the center axis, the distance between the boss surface and the first cutting edge decreases gradually in a direction of approaching from the corner cutting edge to the end cutting edge.

Furthermore, the cutting insert may further include a second end face that has a configuration identical to that of the first end face. Between the second end face and the side face, a main cutting edge and a corner cutting edge, which are identical to the main cutting edge and the corner cutting edge, may be disposed.

The present disclosure provides a rotary cutting tool that includes the cutting insert and a tool body that holds the cutting insert. The tool body rotates around the axis. The rotary cutting tool includes an end mill and a milling cutter. This cutting insert may be a cutting insert that has an approximately polygonal shape, and includes: a corner cutting edge that is formed in an arc shape in a first corner of the approximately polygonal shape; a main cutting edge that is formed in a linear shape in a side portion of the approximately polygonal shape; a first side face portion that is connected to the main cutting edge, has a negative clearance angle, and is formed such that height thereof increases in a direction of approaching the corner cutting edge; and a second side face portion that is connected to the corner cutting edge, has a negative clearance angle, and has height that is greater than a maximum value of the height of the first side face portion.

DETAILED DESCRIPTION

Embodiments of the present invention will be described with reference to the drawings. The following embodiments are examples to describe the present invention, and are not intended to limit the present invention only to these embodiments.

Figure 1:
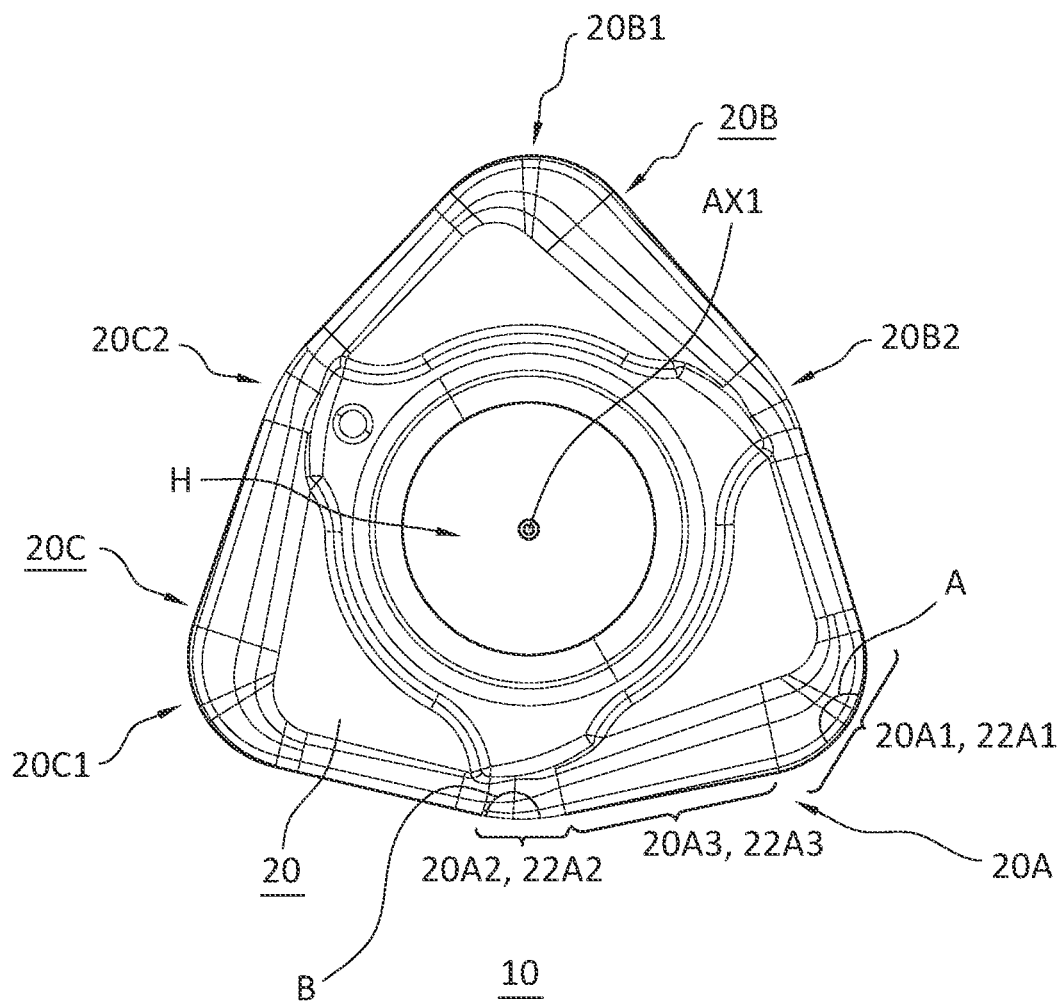
FIG. 1 is a top view of the cutting insert.
Figure 2:
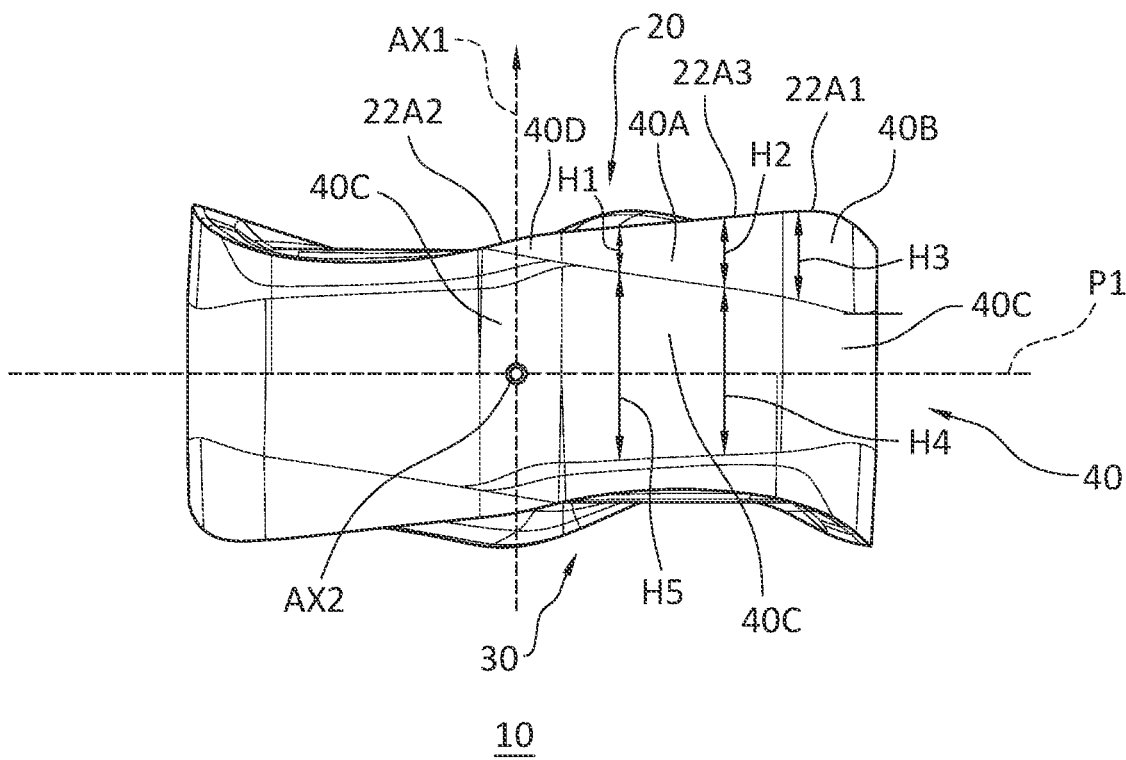
FIG. 2 is a side view of the cutting insert.

FIG. 1 is a top view of a cutting insert 10 according to the present embodiment, and FIG. 2 is a side view of the cutting insert 10. As illustrated in these drawings, the cutting insert 10 includes a first end face 20, a second end face 30, and a side face 40 which connects the first end face 20 and the second end face 30. When it is assumed that the direction the first end face 20 is facing is upward, the second end face 30 is facing downward, which is the opposite direction in which the first end face 20 is facing, and the side face 40 is facing in a lateral direction, which is approximately perpendicular to the upward and downward directions.

As illustrated in FIG. 1, a through hole H penetrates through the first end face 20 and the second end face 30. FIG. 1 is a top view when the first end face 20 is viewed in a direction parallel with a center axis AX1 of the through hole H. The first end face 20 is formed to have an approximately hexagonal shape having six corners, i.e., a first corner 20A1; two corners 20B1 and 20C1 which are formed to be rotationally symmetric with the first corner 20A1 by ±120 degrees respectively, with respect to the center axis AX1 as a reference; a second corner 20A2 which is adjacent to the first corner 20A1 and has a larger vertical angle B than a vertical angle A of the first corner 20A1; and two corners 20B2 and 20C2 which are formed to be rotationally symmetric with the second corner 20A2 by ±120 degrees respectively, with respect to the center axis AX1 as a reference. In this embodiment, the vertical angle B of the second corner 20A2 is formed to be larger than the vertical angle A of the first corner 20A1. For example, the first corner 20A1 is formed to have an 80 to 100 degree vertical angle A, and the second corner 20A2 is formed to have a 140 to 160 degree vertical angle B.

At a connecting portion (crossing ridgeline portion) between the first corner 20A1 of the first end face 20 and the side face 40, a corner cutting edge 22A1 is formed. The corner cutting edge 22A1 is formed in an arc shape, and has a constant curvature, or an approximately constant curvature. The first corner 20A1 of this embodiment is formed so as to have an 80 to 100 degree vertical angle, for example, hence the corner cutting edge 22A1 is also formed to have an 80 to 100 degree center angle.

At a connecting portion (crossing ridgeline portion) between the second corner 20A2 of the first end face 20 and the side face 40, an end cutting edge 22A2 is formed. The end cutting edge 22A2 is formed to have the same curvature as the curvature of the corner cutting edge 22A1, for example. However, these curvatures may be changed as required. For example, in a case of strengthening the end cutting edge 22A2 or improving the finished surface to be a wiper edge, the curvature of the end cutting edge 22A2 is decreased, and in a case of improving the sharpness of the end cutting edge 22A2, on the other hand, the curvature is increased. The second corner 20A2 of this embodiment is formed to have a 140 to 160 degree vertical angle, for example. The corner cutting edge 22A1 is formed to have a 10 to 20 degree center angle when the corner cutting edge 22A1 is approximated by an arc.

At a connecting portion (crossing ridgeline portion) between a first side portion 20A3, which his disposed between the first corner 20A1 and the second corner 20A2 of the first end face 20, and the side face 40, a main cutting edge 22A3 is formed. The main cutting edge 22A3 is formed in a linear shape, for example. One end of the main cutting edge 22A3 is connected with the corner cutting edge 22A1, and the other end thereof is connected with the end cutting edge 22A2. As illustrated in FIG. 2, the main cutting edge 22A3 is formed to be inclined with respect to a reference plane P1, so as to depart more from the reference plane P1 in the direction of approaching from the end cutting edge 22A2 to the corner cutting edge 22A1. The corner cutting edge 22A1, the main cutting edge 22A3 and the end cutting edge 22A2 constituted a first cutting edge 20A. The reference plane P1 is a plane that is perpendicular to the center axis AX1 of the through hole H, and passes through the center portion between the first end face 20 and the second end face 30.

At a connecting portion (crossing ridgeline portion) between the first end face 20 and the side face 40, a second cutting edge 20B and a third cutting edge 20C are also formed to be rotationally symmetric with the first cutting edge 20A by ±120 degrees respectively, with respect to the center axis AX1 as a reference. In other words, at the connecting portion (crossing ridgeline portion) between the first end face 20 and the side face 40, a set of three cutting edges, i.e., the corner cutting edge, the main cutting edge connected to the corner cutting edge, and the end cutting edge connected to the main cutting edge, is formed to be rotationally symmetric by 120 degrees, with respect to the center axis AX1 as a reference. Therefore by changing the corner, cutting can be performed by different cutting edges. However, the present invention is not limited to this. The present invention may be applied to a cutting insert which includes four or more cutting edges, corresponding to the first cutting edge 20A, on the first end face 20 side.

An outer peripheral side region of the first end face 20 functions as a rake surface. A groove or a chip breaker, to connect with the rake surface, maybe disposed in the first end face 20.

A boss surface 20D is formed in the vicinity of the through hole of the first end face 20. When the second end face 30 is used as the cutting edge, the boss surface 20D functions as a surface to secure the cutting insert 10 to a chip holder by pressing the cutting insert 10 into a chip mounting seat. The boss surface 20D is formed to be perpendicular to the center axis AX1 of the through hole H.

As illustrated in FIG. 2, the cutting insert 10 is formed to be rotationally symmetric by 120 degrees, with respect to the center axis AX1 of the through hole H as a reference. The cutting insert 10 also exists on the reference plane P1, which is perpendicular to the center axis AX1 of the through hole H and passes through the center portion between the first end face 20 and the second end face 30, and is formed to be rotationally symmetric by 180 degrees, with respect to, as a reference, a virtual line AX2 that intersects with the center axis AX1 of the through hole H. Therefore the second end face 30, which is disposed on the opposite side of the first end face 20 of the cutting insert 10, has a structure that is identical with the first end face 20. Further, at a connecting portion (crossing ridgeline portion) between the second end face 30 and the side face 40, a cutting edge having an identical structure as the first cutting edge (which is constituted of the corner cutting edge 22A1, the main cutting edge 22A3 and the end cutting edge 22A2), and two cutting edges which are formed to be rotationally symmetric with this cutting edge by ±120 degrees respectively with respect to the center axis AX1 as a reference, are formed.

The side face 40 is formed so as to connect the first end face 20 and the second end face 30. The side face 40 includes: a first side face portion 40A which is connected to the main cutting edge 22A3; a second side face portion 40B which is connected to the corner cutting edge 22A1; and a third side face portion 40C which is connected to the first side face portion 40A and the second side face portion 40B.

Figure 3:
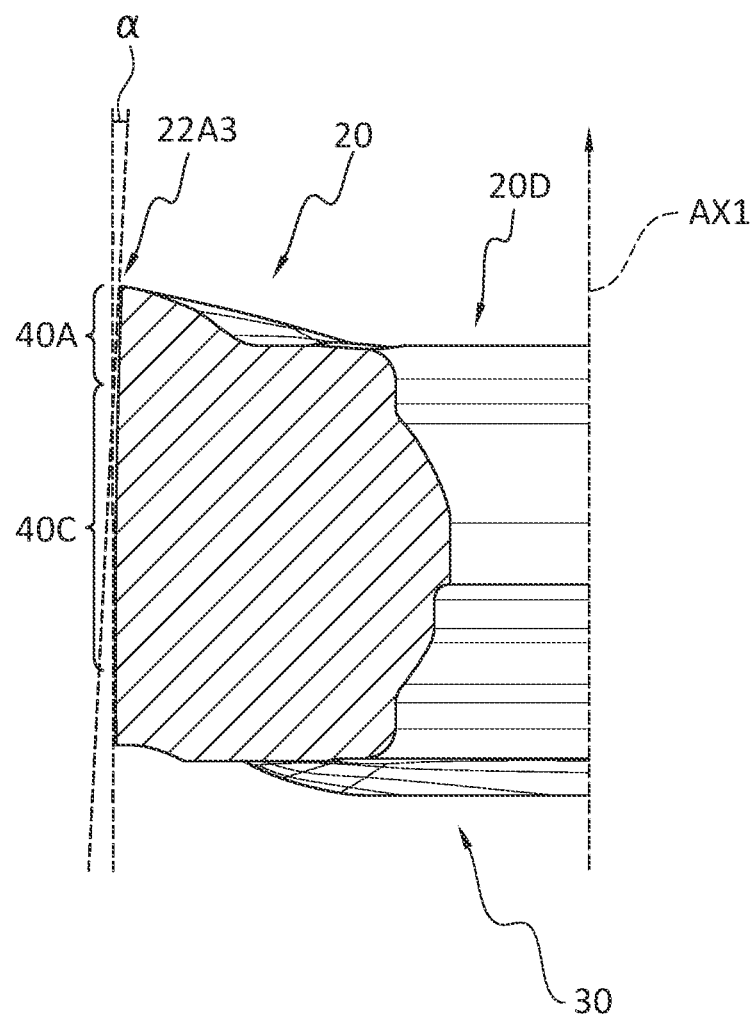
FIG. 3 is a cross-sectional view when the cutting insert is sectioned at a plane passing through the first side face portion and the center axis.
Figure 4:
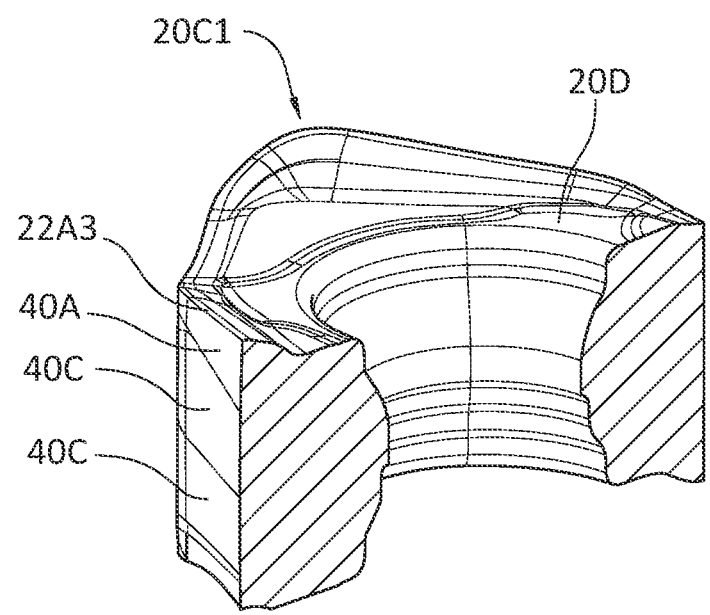
FIG. 4 is a perspective view of the cross-section when the cutting insert is sectioned at the plane passing through the first side face portion and the center axis.

FIG. 3 is a cross-sectional view when the cutting insert 10 is sectioned at a plane passing through the first side face portion 40A and the center axis AX1. FIG. 4 is a perspective view thereof.

As illustrated in these drawings, the first side face portion 40A is formed to have a negative clearance angle, that is, the first side face portion 40A is a reverse positive surface. The first side face portion 40A is formed such that the distance from the center axis AX1 increases (widens) in the direction of approaching the reference plane P1. Therefore damage of the main cutting edge 22A3 can be suppressed. According to this embodiment, in the cross-sectional view sectioned at a plane passing through the first side face portion 40A and the center axis AX1, the angle α formed by the first side face portion 40A and the center axis AX1 (FIG. 3), that is, the clearance angle of the first side face portion 40A, is 3 to 5 degrees, for example.

As illustrated in FIG. 2, the first side face portion 40A is formed from one end of the main cutting edge 22A3 connected to the end cutting edge 22A2 to the other end of the main cutting edge 22A3 connected to the corner cutting edge 22A1. The height of the first side face portion 40A in the center axis direction increases in the direction of approaching from the end cutting edge 22A2 to the corner cutting edge 22A1. For example, the height H2 of the first side face portion 40A at a position on the corner cutting edge 22A1 side is higher than the height H1 of the first side face portion 40A at a position on the end cutting edge 22A2 side.

As illustrated in FIG. 2, the height of the first side face portion 40A linearly increases in this embodiment. However, the present invention is not limited to this, and the height of the first side face portion 40A may be increased in a curved line. Further, a portion in which the height is constant may be included. Furthermore, the first side face portion 40A is formed at a position that is distanced from the reference plane P1 in the upward direction. In other words, the maximum value of the height of the first side face portion 40A is lower than half of the average value of the distances between a plane approximating the first end face 20 and a plane approximating the second end face 30.

In the top view illustrated in FIG. 1, the distance between the center axis AX1 and the main cutting edge 22A3 increases in the direction of approaching from the end cutting edge 22A2 to the corner cutting edge 22A1. This means that the first side face portion 40A, which is connected to the main cutting edge 22A3 and has a negative clearance angle, is formed such that the height in the center axis direction increases as the distance from the center axis AX1 increases.

The second side face portion 40B is connected to the corner cutting edge 22A1 in the upward direction, and is connected to the first side face portion 40A in the lateral direction. The second side face portion 40B is formed to have a negative clearance angle, just like the first side face portion 40A, that is, the second side face portion 40B is a reverse positive surface, and is formed so as to smoothly connect with the first side face portion 40A, for example. The second side face portion 40B is formed such that the distance from the center axis AX1 increases (widens) in the direction of approaching the reference plane P1. Therefore damage of the corner cutting edge 22A1 can be suppressed. According to this embodiment, in the cross-sectional view sectioned at a plane passing through the second side face portion 40B and the center axis AX1, the angle α formed by the second side face portion 40B and the center axis AX1, that is, the clearance angle of the second side face portion 40B, is 3 to 5 degrees, for example.

As illustrated in FIG. 2, the second side face portion 40B is formed from one end of the corner cutting edge 22A1 connected to the main cutting edge 22A3 to at least an intermediate portion of the corner cutting edge 22A1. The height of the second side face portion 40B in the center axis AX1 direction increases in the direction departing from the main cutting edge 22A3. Further, the height of the second side face portion 40B is higher than the maximum value of the height of the first side face portion 40A. For example, the height H3 of the second side face portion 40B at the position indicated in FIG. 2, is higher than the height H2 of the first side face portion 40A at the position indicated in FIG. 2. Therefore the durability of the corner cutting edge 22A1 can be enhanced more than the main cutting edge 22A3. Furthermore, the second side face portion 40B is formed at a position that is distance from the reference plane P1 in the upward direction. In other words, the maximum value of the height of the second side face portion 40B is lower than half of the average value of the distances between the plane approximating the first end face 20 and a plane approximating the second end face 30.

The third side face portion 40C is connected to the lower sides of the first side face portion 40A and the second side face portion 40B on the reference plane P1 side. The third side face portion 40C is a negative surface, and in the cross-sectional view (FIG. 3) sectioned at a plane passing through the third side face portion 40C and the center axis AX1, the angle formed by the third side face portion 40C and the center axis AX1 is 0 degrees, that is, the third side face portion 40C and the center axis AX1 are parallel. The height of the third side face portion 40C in the center axis AX1 direction is preferably higher than half of the height of the cutting insert 10, and is higher than half of the distance between the plane approximating the first end face 20 and the plane approximating the second end face 30, for example. Furthermore, as mentioned above, the height of the first side face portion 40A in the center axis AX1 direction decreases in the direction of approaching from the corner cutting edge 22A1 to the end cutting edge 22A2 (FIG. 2). Therefore the height of the third side face portion 40C in the center axis AX1 direction increases in the direction of approaching from the corner cutting edge 22A1 to the end cutting edge 22A2. For example, the height H5 of the third side face portion 40C at a position on the end cutting edge 22A2 side is higher than the height H4 of the third side face portion 40C at a position on the corner cutting edge 22A1 side.

The fourth side face portion 40D is connected to the end cutting edge 22A2 in the upward direction, is connected to the first side face portion 40A in the lateral direction, and is connected to the third side face portion 40C in the downward direction. The fourth side face portion 40D is formed to have a negative clearance angle, that is, the fourth side face portion 40D is a reverse positive surface, and is formed so as to smoothly connect with the first side face portion 40A, for example. As illustrated in FIG. 2, the height of the fourth side face portion 40D in the center axis direction increases in the direction of approaching one end connected to the main cutting edge 22A3, and is zero at the other end.

The side faces 40 are formed to be rotationally symmetric by 120 degrees with respect to the center axis AX1, just like the cutting edges. Therefore the side face portions corresponding to the first side face portion 40A to the fourth side face portion 40D are formed to be rotationally symmetric by ±120 degrees corresponding to the second cutting edge and the third cutting edge respectively.

As mentioned above, the cutting insert 10 is formed on the reference plane P1 so as to be rotationally symmetric by 180 degrees with respect to the virtual line AX2, that passes through the second corner 20A2 where the end cutting edge 22A2 is formed in the top view. Therefore the side face portions, corresponding to the first side face portion 40A, the second side face portion 40B and the fourth side face portion 40D, are disposed so as to adjoin the cutting edge formed on the second end face 30 side. Further, the third side face portion 40C is also formed to be rotationally symmetric by 180 degrees with respect to the virtual line AX2.

Figure 5A:
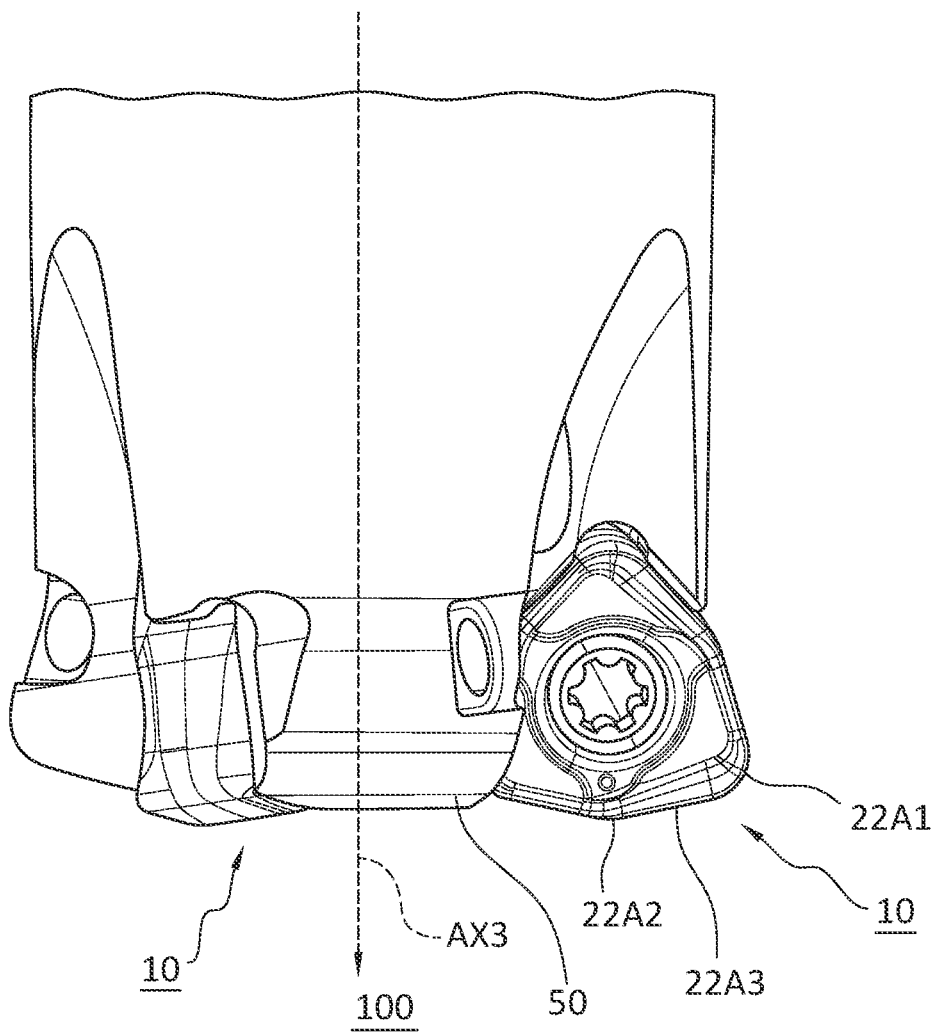
FIG. 5A is an enlarged view of a side face of the rotary cutting tool in the vicinity of the front end of the tool body.
Figure 5B:
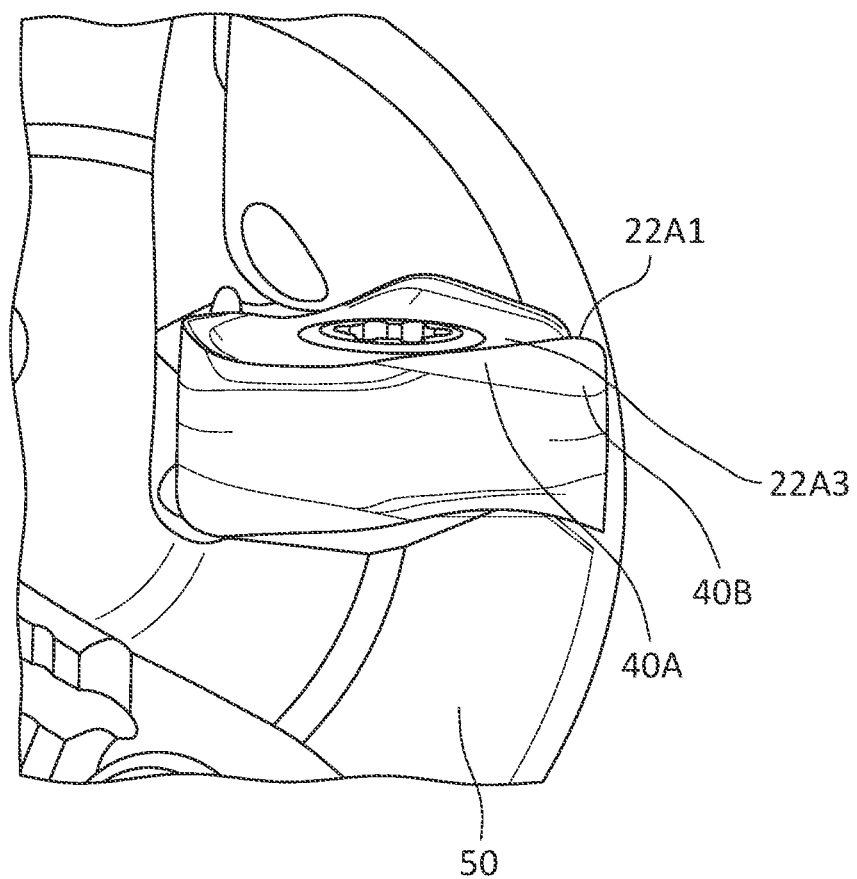
FIG. 5B is an enlarged view of the front end of the rotary cutting tool in the vicinity of the front end of the tool body.

FIG. 5A is an enlarged view of a side face of the rotary cutting tool 100 when three cutting inserts 10 are installed in the tool body 50 which rotates around the rotation axis AX3, viewed in a direction perpendicular to the rotation axis AX3 of the tool body 50. FIG. 5B is an enlarged view of the front end of the rotary cutting tool 100 viewed in a direction parallel with the rotation axis AX3 of the tool body 50.

As illustrated in these drawings, the rotary cutting tool 100 includes the cutting inserts 10 and the tool body 50 in which the cutting inserts 10 are installed. Each cutting insert 10 is installed in the tool body 50 by engaging a male screw inserted into the through hole H with an internal thread formed on the chip mounting seat of the tool body 50, and pressing the cutting insert 10 into the tool body 50 using this male screw. At this time, the first end face 20 turns to the rotating direction of the tool body 50, and the boss surface of the second end face 30, which turns to the opposite direction, is pushed into the chip mounting seat of the tool body 50. Here the first side face portion 40A to the fourth side face portion 40D turns to the direction of the rotation axis AX3 of the tool body 50 (downward direction in FIG. 5A). The corner cutting edge 22A1 is located at a peripheral portion that is most distant from the rotation axis AX3 of the tool body 50, and slightly extends from the tool body 50 in the outer diameter direction. The main cutting edge 22A3 and the end cutting edge 22A2 connected to this corner cutting edge 22A1 slightly extend from the tool body 50 in the rotation axis AX3 direction. On the other hand, out of the side faces 40 of the cutting insert 10, the two side face portions, which are formed to be rotationally symmetric by ±120 degrees from the third side face portion 40C, are constrained surfaces pressed by the tool body 50 respectively. As mentioned above, the height of the third side face portion 40C, which is connected to the first side face portion 40A, in the center axis AX1 direction, increases in the direction of approaching from the corner cutting edge 22A1 to the end cutting edge 22A2, hence each height of these two side face portions in the center axis direction also increases in the direction of approaching from the corresponding corner cutting edge to the corresponding end cutting edge. Therefore the portion that functions as the constraining surface pressed to the tool body 50 can be increased compared with prior art.

The effect of the above mentioned cutting insert 10 and the rotary cutting tool 100 will be described next.

The inventors of the present patent application focused on an aspect in in which portions, of which strength is low in the structure of the polygonal-shaped cutting insert 10, are corner portions which correspond to vertexes, in particular the vicinity of corners of which angle is small. Further, the present inventors focused on an aspect in which portions, of which strength is low in processing of the rotary cutting tool, are outer peripheral portions. As a result, the present inventors focused on an aspect in which the corner cutting edge 22A1, disposed in the first corner 20A1, which is located in the outer peripheral portion and has a small angle, in the cutting insert 10, is an area where strength is low in the structure and in processing, and therefore has high possibility of being damaged. The cutting insert 10 according to this embodiment has the second side face portion 40B, which has a negative clearance angle and has height higher than the maximum value of the height of the first side face portion 40A, as the side face connected to the corner cutting edge 22A1, hence damage of the corner cutting edge 22A1 can be suppressed.

In the main cutting edge 22A3, the boundary abrasion tends to be a major factor that determines the life span of the edge, hence enhancing the strength of the edge is desired. However, decreasing the rake angle increases the cutting resistance. Therefore the first side face portion 40A, which has the negative clearance angle, is disposed as the side face connected to the main cutting edge 22A3, whereby durability of the main cutting edge can be increased.

Out of the main cutting edge 22A3, the portion on the end cutting edge 22A2 side (on the inner diameter side) is less likely to be damaged than the portion on the corner cutting edge 22A1 side (on the outer diameter side). Therefore the height of the first side face portion 40A on the end cutting edge 22A2 side is lower than the height of the first side face portion 40A on the corner cutting edge 22A1 side. As a result, in the third side face portion 40C, which is the negative surface, the height of the third side face portion 40C on the end cutting edge 22A2 side can be increased to be higher than the height of the third side face portion 40C on the corner cutting edge 22A1 side. The third side face portion 40C, which is the negative surface, is a portion that is pressed into the tool body 50, and is used as a constrained surface when the second cutting edge 20B or the third cutting edge 20C is used for cutting. Therefore by making the third side face portion 40C larger, the area of the constrained surface can be increased, and the cutting insert 10 can be installed in the tool body 50 stably. In addition, a clearance is formed between the third side face portion 40C and the main cutting edge 22A3 by the first side face portion 40A, hence in the case where the main cutting edge 22A3 is damaged, it can be suppressed that damage reaches the constrained surface and decreases the clamping force when the corner is changed for cutting.

Further, in the flank in the vicinity of the end cutting edge 22A2 (flat drag), which is in contact with a processing object for a long time during processing, flank abrasion easily occurs. Therefore in the cutting insert 10 according to this embodiment, the vertical angle of the second corner 20A2, where the end cutting edge 22A2 is disposed, is large, so as to enhance durability. Furthermore, the height of the fourth side face portion 40D, which is connected to the end cutting edge 22A2, is lower than the height of the adjoining first side face portion 40A. Thereby, with a negative clearance angle being formed, the area of the fourth side face portion, which is most likely to wear, is decreased, and flank abrasion in the vicinity of the end cutting edge 22A2 can be suppressed.

In addition, the main cutting edge 22A3 has an inclination so as to depart more from the reference plane P1 and the boss surface 20D in the direction of approaching the corner cutting edge 22A1, and approach more (decrease distance) to the reference plane P1 and the boss surface 20D in the direction of approaching the end cutting edge 22A2. This makes it possible to discharge the chips, which are generated in the vicinity of the corner cutting edge 22A1, from the end cutting edge 22A2 side. In particular, discharge of the chips becomes easier when the corner portions are processed.

Further, the second end face 30 also has this configuration, hence the cutting insert 10 can be used as a double-sided negative insert. Furthermore, the first end face 20 is formed to be approximately hexagonal, which allows to increase the vertical angle of each corner. Hence durability can be enhanced.

The present invention can be modified in various ways without departing from the scope of the invention. For example, a part of the composing elements of an embodiment can be added to another embodiment within a scope of normal creativity of a person skilled in the art. Further, a part of the composing elements of an embodiment may be replaced with corresponding composing elements of another embodiment.

What is claimed is:

1. A cutting insert having an approximately polygonal hexagonal shape, the cutting insert comprising:
    a first end face;
    a second end face;
    a side surface;
    a through hole formed on the first and second end faces defining a center axis and an axial direction; and
    a reference plane disposed perpendicular to the center axis and passing through the side surface;
    wherein the first end face sequentially comprises a main cutting edge and a corner cutting edge connected to the main cutting edge;
    a first cutting edge that includes the main cutting edge and the corner cutting edge, a second cutting edge, and a third cutting edge which are formed to be rotationally symmetric respectively with the first cutting edge, with respect to a center axis of the through hole as a reference;
    wherein the first end face is formed to be an approximately hexagonal shape and includes:
    a first corner in which the corner cutting edge is provided;
    two corners which are formed to be rotationally symmetric with the first corner by 120 degrees respectively, with respect to the center axis of the through hole as a reference;
    a second corner which adjoins the first corner has a larger vertical angle than the first corner, and includes the main cutting edge which is provided between the first corner and the second corner; and
    two corners which are formed to be rotationally symmetric with the second corner by 120 degrees respectively, with respect to the center axis of the through hole as a reference;
    wherein the side face includes a first side face portion connected to the main cutting edge, a second side face portion connected to the corner cutting edge, and a third side face portion connected in an axial direction to each of the first side face portion and the second side portion;
    the first side face portion has a negative clearance angle such that a distance from the center axis increases in the direction of approaching the reference plane, therefore having a reverse positive surface, and in a side view a height of the first side face portion increases gradually in a direction of approaching the corner cutting edge;
    the second side face portion has a negative clearance angle such that a distance from the center axis increases in the direction of approaching the reference plane, therefore having a reverse positive surface, and in a side view a height of the second side face portion is greater than a maximum value of the height of the first side face portion;
    the third side face portion has a negative clearance angle such that the third side face portion is parallel to the center axis, and in a side view, a height of the third side face portion, in the center axis direction, increases in the direction of approaching from the corner cutting edge to the main cutting edge.

2. The cutting insert according to claim 1, wherein the first cutting edge further includes an end cutting edge that is connected to the main cutting edge and is formed in the second corner.

3. The cutting insert according to claim 1, further comprising a side face that is connected to the first end face, and includes:
    the first side face portion;
    the second side face portion; and
    a third side face portion that is connected to the first side face portion and the second side face portion, and is parallel with the center axis of the through hole.

4. The cutting insert according to claim 2, wherein
    a boss surface is formed on the first end face, and
    in a side view viewed in a direction perpendicular to the center axis, the distance between the boss surface and the main cutting edge decreases gradually in a direction of approaching from the corner cutting edge to the end cutting edge.

5. The cutting insert according to claim 1, further comprising a second end face that has a configuration identical to that of the first end face.

6. A rotary tool, comprising:
    a tool body that rotates; and
    the cutting insert according to claim 1, which is installed in the tool body.

* * * * *